(12) United States Patent
Takayasu et al.

(10) Patent No.: US 8,028,786 B2
(45) Date of Patent: *Oct. 4, 2011

(54) PASSENGER'S WEIGHT MEASUREMENT DEVICE FOR VEHICLE SEAT AND ATTACHMENT STRUCTURE FOR LOAD SENSOR

(75) Inventors: Wataru Takayasu, Reynoldsburg, OH (US); Shinya Ishima, Shioya-gun (JP); Shigeru Endo, Shioya-gun (JP); Kenji Sato, Sakura (JP)

(73) Assignee: TS Tech Co., Ltd., Asaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/875,594

(22) Filed: Sep. 3, 2010

(65) Prior Publication Data
US 2011/0000719 A1 Jan. 6, 2011

Related U.S. Application Data

(63) Continuation of application No. 11/992,548, filed as application No. PCT/JP2006/319477 on Sep. 29, 2006, now Pat. No. 7,836,997.

(30) Foreign Application Priority Data

Sep. 30, 2005 (JP) ................................ 2005-286881

(51) Int. Cl.
*G01G 19/52* (2006.01)
*G01G 19/12* (2006.01)
*B60R 21/015* (2006.01)
*B60N 2/44* (2006.01)

(52) U.S. Cl. ... 180/273; 177/136; 177/144; 177/DIG. 9; 73/856; 280/735; 411/347; 411/371.2; 411/372; 411/929.1; 411/946

(58) Field of Classification Search .............. 411/371.2, 411/372, 347, 341, 929.1, 946; 177/136, 177/144, DIG. 9; 180/273; 280/735; 73/856
See application file for complete search history.

(56) References Cited

U.S. PATENT DOCUMENTS
1,679,620 A * 8/1928 Moore .......................... 411/347
(Continued)

FOREIGN PATENT DOCUMENTS
DE 103 15 400 A1 10/2004
(Continued)

OTHER PUBLICATIONS

"Radius" from eFunda Design Standards website, Copyright 2010 by eFunda, Inc. (http://www.efunda.com/designstandards/plastic_design/radius.cfm).

(Continued)

*Primary Examiner* — Randy W Gibson
(74) *Attorney, Agent, or Firm* — Oliff & Berridge, PLC

(57) ABSTRACT

A lower rail is fixed to a vehicle floor, and an upper rail is movable in a rear and front direction with respect to the lower rail. A load sensor is fixed to an upper surface of the upper rail. A rectangular frame is attached onto the load sensor, a rod of the load sensor sequentially penetrates a web of the rectangular frame and a spring holder upward, and a coil spring is wound around the rod. A nut is screwed to the rod, and the nut tightens a bottom of a cup portion of the spring holder. The coil spring is sandwiched between a flange of the spring holder and the web and is compressed by tightening the nut.

44 Claims, 9 Drawing Sheets

U.S. PATENT DOCUMENTS

| | | | |
|---|---|---|---|
| 4,178,037 | A | 12/1979 | Pickles |
| 4,182,255 | A | 1/1980 | Reid |
| 4,281,443 | A | 8/1981 | Threlfall |
| 4,353,565 | A | 10/1982 | Smith et al. |
| 4,597,552 | A | 7/1986 | Nishino |
| 5,110,177 | A | 5/1992 | Akio |
| 5,286,076 | A | 2/1994 | DeVoss et al. |
| 5,308,148 | A | 5/1994 | Peterson et al. |
| 5,421,124 | A | 6/1995 | Zuccaro |
| 5,478,975 | A | 12/1995 | Ford |
| 5,492,388 | A | 2/1996 | Kawasaki |
| 5,600,104 | A | 2/1997 | McCauley et al. |
| 5,921,624 | A | 7/1999 | Wu |
| 5,991,676 | A | 11/1999 | Podoloff et al. |
| 6,039,344 | A | 3/2000 | Mehney et al. |
| 6,089,478 | A | 7/2000 | Truan et al. |
| 6,145,909 | A | 11/2000 | Staley et al. |
| 6,150,619 | A | 11/2000 | Borngasser |
| 6,231,076 | B1 | 5/2001 | Blakesley et al. |
| 6,356,200 | B1 | 3/2002 | Hamada et al. |
| 6,367,859 | B1 | 4/2002 | Flory et al. |
| 6,405,987 | B1 | 6/2002 | Andrigo et al. |
| 6,555,756 | B2 | 4/2003 | Nakamura et al. |
| 6,555,765 | B2 | 4/2003 | Paine |
| 6,559,392 | B1 | 5/2003 | Haynes et al. |
| 6,637,824 | B1 | 10/2003 | Yokota |
| 6,644,903 | B1 * | 11/2003 | Arand ............................ 411/352 |
| 6,677,539 | B2 | 1/2004 | Miura et al. |
| 6,695,379 | B1 | 2/2004 | Ishida |
| 6,702,376 | B1 | 3/2004 | Shen |
| 6,772,985 | B2 | 8/2004 | Lee |
| 6,786,691 | B2 * | 9/2004 | Alden, III ................. 411/371.2 |
| 6,916,997 | B2 | 7/2005 | Thakur et al. |
| 6,969,809 | B2 | 11/2005 | Rainey |
| 6,981,717 | B2 | 1/2006 | Sakamoto et al. |
| 7,038,146 | B2 | 5/2006 | Saito et al. |
| 7,091,426 | B2 * | 8/2006 | Nagai et al. ................... 177/144 |
| 7,137,665 | B2 | 11/2006 | Osawa et al. |
| 7,185,867 | B2 | 3/2007 | Hill et al. |
| 7,189,931 | B2 | 3/2007 | Hida et al. |
| 7,195,261 | B2 | 3/2007 | Yoshida et al. |
| 7,210,358 | B2 | 5/2007 | Yamazaki |
| 7,281,766 | B2 | 10/2007 | Fujita et al. |
| 7,328,627 | B2 | 2/2008 | Kawabata et al. |
| 7,373,846 | B2 | 5/2008 | Furukawa et al. |
| 7,422,291 | B2 | 9/2008 | Nagayama |
| 7,435,918 | B2 | 10/2008 | Becker et al. |
| 7,438,350 | B1 | 10/2008 | Peterson et al. |
| 7,455,343 | B2 * | 11/2008 | Endo et al. ................... 296/68.1 |
| 7,488,026 | B1 | 2/2009 | Jovicevic |
| 7,510,161 | B2 | 3/2009 | Fischer et al. |
| 7,520,175 | B2 | 4/2009 | Matsukawa et al. |
| 7,604,213 | B2 | 10/2009 | Choi et al. |
| 7,614,680 | B2 * | 11/2009 | Endo et al. ................... 296/68.1 |
| 7,729,122 | B2 * | 6/2010 | Wong ............................ 361/710 |
| 7,731,281 | B2 | 6/2010 | Kurita et al. |
| 7,762,150 | B2 | 7/2010 | Kawabata et al. |
| 7,793,557 | B2 | 9/2010 | Endo et al. |
| 7,823,951 | B2 | 11/2010 | Endo et al. |
| 7,836,997 | B2 | 11/2010 | Takayasu et al. |
| 7,870,927 | B2 | 1/2011 | Endo et al. |
| 7,878,570 | B2 | 2/2011 | Endo et al. |
| 2003/0168895 | A1 | 9/2003 | Sakai et al. |
| 2004/0100388 | A1 | 5/2004 | Yoshida et al. |
| 2004/0160113 | A1 | 8/2004 | Rehfuss et al. |
| 2005/0061643 | A1 | 3/2005 | Rainey |
| 2005/0099041 | A1 | 5/2005 | Becker et al. |
| 2005/0109909 | A1 | 5/2005 | Osawa et al. |
| 2005/0284668 | A1 | 12/2005 | Hida et al. |
| 2005/0284669 | A1 | 12/2005 | DiPaola et al. |
| 2006/0010984 | A1 | 1/2006 | Yamazaki |
| 2006/0048582 | A1 | 3/2006 | Furukawa et al. |
| 2007/0012487 | A1 | 1/2007 | Becker et al. |
| 2007/0045986 | A1 | 3/2007 | Lirot |
| 2007/0057527 | A1 | 3/2007 | Endo et al. |
| 2008/0036251 | A1 | 2/2008 | Endo et al. |
| 2008/0079296 | A1 | 4/2008 | Endo et al. |
| 2008/0084086 | A1 | 4/2008 | Endo et al. |
| 2009/0079239 | A1 | 3/2009 | Endo et al. |
| 2009/0139774 | A1 | 6/2009 | Takayasu et al. |
| 2009/0139775 | A1 | 6/2009 | Takayasu et al. |
| 2009/0294185 | A1 | 12/2009 | Bruzzone et al. |
| 2009/0301793 | A1 | 12/2009 | Endo et al. |
| 2009/0301794 | A1 | 12/2009 | Endo et al. |
| 2010/0282522 | A1 | 11/2010 | Endo et al. |
| 2011/0000719 | A1 | 1/2011 | Takayasu et al. |
| 2011/0006580 | A1 | 1/2011 | Ishimoto et al. |
| 2011/0018301 | A1 | 1/2011 | Endo et al. |
| 2011/0018302 | A1 | 1/2011 | Endo et al. |

FOREIGN PATENT DOCUMENTS

| | | | |
|---|---|---|---|
| GB | 2 415 787 | A | 1/2006 |
| JP | 63-026466 | U | 2/1988 |
| JP | 05-043031 | U | 6/1993 |
| JP | A-8-164039 | | 6/1996 |
| JP | A-9-207638 | | 8/1997 |
| JP | 10-297334 | A | 11/1998 |
| JP | 11-108746 | A | 4/1999 |
| JP | 11-304579 | A | 11/1999 |
| JP | 2000-280813 | A | 10/2000 |
| JP | 2001-030819 | A | 2/2001 |
| JP | A-2001-050329 | | 2/2001 |
| JP | 2001-158269 | A | 6/2001 |
| JP | A-2003-011709 | | 1/2003 |
| JP | 2003-166872 | A | 6/2003 |
| JP | 2003-237535 | A | 8/2003 |
| JP | 2003-287458 | A | 10/2003 |
| JP | 2004-210167 | A | 7/2004 |
| JP | A-2004-306849 | | 11/2004 |
| JP | 2008-296657 | A | 12/2008 |

OTHER PUBLICATIONS

"What is eFunda" from eFunda Design Standards website, Copyright 2010 by eFunda, Inc. (http://www.efunda.com/about/about.cfm).
English-language translation of Japanese Office Action in Japanese Application No. 2004-223456, mailed Aug. 3, 2010.
Office Action for U.S. Appl. No. 12/536,075, mailed Apr. 7, 2010.
Office Action for U.S. Appl. No. 12/536,075, mailed Oct. 15, 2010.
Notice of Allowance for U.S. Appl. No. 12/536,075, mailed Nov. 8, 2010.
Office Action for U.S. Appl. No. 12/536,124, mailed Jul. 1, 2010.
Office Action for U.S. Appl. No. 12/536,151, mailed Aug. 10, 2010.
Office Action for U.S. Appl. No. 11/992,418, mailed Jul. 2, 2009.
Notice of Allowance for U.S. Appl. No. 11/992,418, mailed Feb. 18, 2010.
Office Action for U.S. Appl. No. 11/992,418, mailed Jun. 3, 2010.
Office Action for U.S. Appl. No. 12/588,922, mailed Sep. 29, 2010.
European Search Report for European Application No. 10007613.2 dated Oct. 9, 2010.
Office Action for U.S. Appl. No. 12/588,922, mailed Mar. 8, 2011.
Notice of Allowance for U.S. Appl. No. 12/536,151, mailed Mar. 25, 2011.
Office Action for U.S. Appl. No. 12/961,758, mailed Mar. 28, 2011.
Office Action for U.S. Appl. No. 13/010,429, mailed May 2, 2011.
Office Action for U.S. Appl. No. 11/992,418, mailed Jan. 13, 2011.
Notice of Allowance for U.S. Appl. No. 12/536,124, mailed Jan. 18, 2011.
U.S. Appl. No. 12/985,932, filed Jan. 6, 2011.
U.S. Appl. No. 13/010,429, filed Jan. 20, 2011.
U.S. Appl. No. 11/992,418, filed Mar. 21, 2008.
U.S. Appl. No. 12/588,922, filed Nov. 2, 2009.
U.S. Appl. No. 12/536,075, filed Aug. 5, 2009.
U.S. Appl. No. 12/536,124, filed Aug. 5, 2009.
U.S. Appl. No. 12/536,151, filed Aug. 5, 2009.
U.S. Appl. No. 12/961,758, filed Dec. 7, 2010.
Office Action for U.S. Appl. No. 12/536,151, mailed Jan. 31, 2011.

* cited by examiner

PASSENGER'S WEIGHT MEASUREMENT DEVICE FOR VEHICLE SEAT AND ATTACHMENT STRUCTURE FOR LOAD SENSOR

This is a Continuation of application Ser. No. 11/992,548 filed Mar. 25, 2008 now U.S. Pat. No. 7,836,997, which in turn is a National Stage of PCT/JP2006/319477 filed Sep. 29, 2006, which in turn claims the benefit of Japanese Application No. 2005-286881 filed Sep. 30, 2005. The disclosures of the prior applications are hereby incorporated by reference herein in their entirety.

TECHNICAL FIELD

The present invention relates to a passenger's weight measurement device for a vehicle seat, which measures a weight of a passenger seated on the vehicle seat, and to an attachment structure for attaching a load sensor to the passenger's weight measurement device.

BACKGROUND ART

In recent years, in some cases, operations of various safety devices such as a seat belt and an air bag have been controlled in accordance with a weight of a passenger seated on a vehicle seat for the purpose of enhancing performance of the safety devices. In a conventional passenger's weight measurement device that measures the weight of the seated passenger, a load sensor is interposed between a vehicle floor and the vehicle seat (for example, refer to Patent Document 1 and Patent Document 2).
Patent Document 1: JP A H8-164039
Patent Document 2: JP A H9-207638

DISCLOSURE OF THE INVENTION

Problems to be Solved by the Invention

However, there is a dimension error or an assembling position error when the passenger's weight measurement device is assembled, when the vehicle seat is fixed to the passenger's weight measurement device or when the passenger's weight measurement device is fixed to the vehicle floor, or the like. Accordingly, it has been difficult to assemble the passenger's weight measurement device.

In this connection, it is an object of the present invention to provide a passenger's weight measurement device for a vehicle seat, which is more easily assembled, and to provide an attachment structure for a load sensor.

Means for Solving the Problems

In order to solve the above-described problem, a passenger's weight measurement device for a vehicle seat according to the present invention comprises: an upper rail provided on a lower rail fixed to a vehicle floor so as to be movable in a rear and front direction; a load sensor fixed onto the upper rail; and a frame provided on the load sensor and below the vehicle seat, wherein a rod is extended from the load sensor, the rod sequentially penetrates the frame and a spring holder and is inserted into a coil spring, a nut is screwed to the rod from above the spring holder, and the coil spring is sandwiched between the spring holder and the frame and is compressed by tightening the nut to the spring holder.

An attachment structure for a load sensor according to the present invention is an attachment structure for attaching the load sensor to a frame provided below a vehicle seat, wherein a rod is extended from the load sensor, the rod sequentially penetrates the frame and a spring holder and is inserted into a coil spring, a nut is screwed to the rod from above the spring holder, and the coil spring is sandwiched between the spring holder and the frame and is compressed by tightening the nut to the spring holder.

In the present invention, preferably, the spring holder includes a cup portion in which a through hole through which the rod penetrates is formed in a bottom, and a flange formed on an outer circumference of the cup portion, and the cup portion is inserted through the coil spring, the nut is inserted into the cup portion to tighten the bottom of the cup portion, and the coil spring is sandwiched between the flange and the flame.

In the present invention, preferably, a collar through which the rod is inserted penetrates the frame, the spring holder is sandwiched between the collar and the nut, and the coil spring and the collar are sandwiched between the nut and the load sensor.

In accordance with the present invention, the nut is screwed to the rod from above the spring holder, and the coil spring is sandwiched between the spring holder and the frame by tightening the nut. Accordingly, the frame can be shifted in the vertical direction with respect to the load sensor.

Effect of the Invention

In accordance with the present invention, the frame can be shifted in the vertical direction with respect to the load sensor. Accordingly, even if the lower rail, the upper rail, the frame and the like are distorted during the assembling or the like, an initial load generated by such distortions can be prevented from being applied to the load sensor.

Moreover, the coil spring is sandwiched between the frame and the spring holder in a state of being compressed by tightening the nut. Accordingly, the load sensor is fixed to the frame more stably and appropriately. Therefore, it becomes easier to assemble the passenger's weight measurement device.

Furthermore, the load is stably applied from the coil spring to the nut owing to elastic deformation of the coil spring, which is caused by tightening the nut.

BEST MODE FOR CARRYING OUT THE INVENTION

A best mode for carrying out the present invention will be described below by using the drawings. On embodiments to be described below, a variety of technically preferable limitations are imposed in order to carry out the present invention; however, the scope of the invention is not limited to the following embodiments and illustrated examples.

Figure 1:
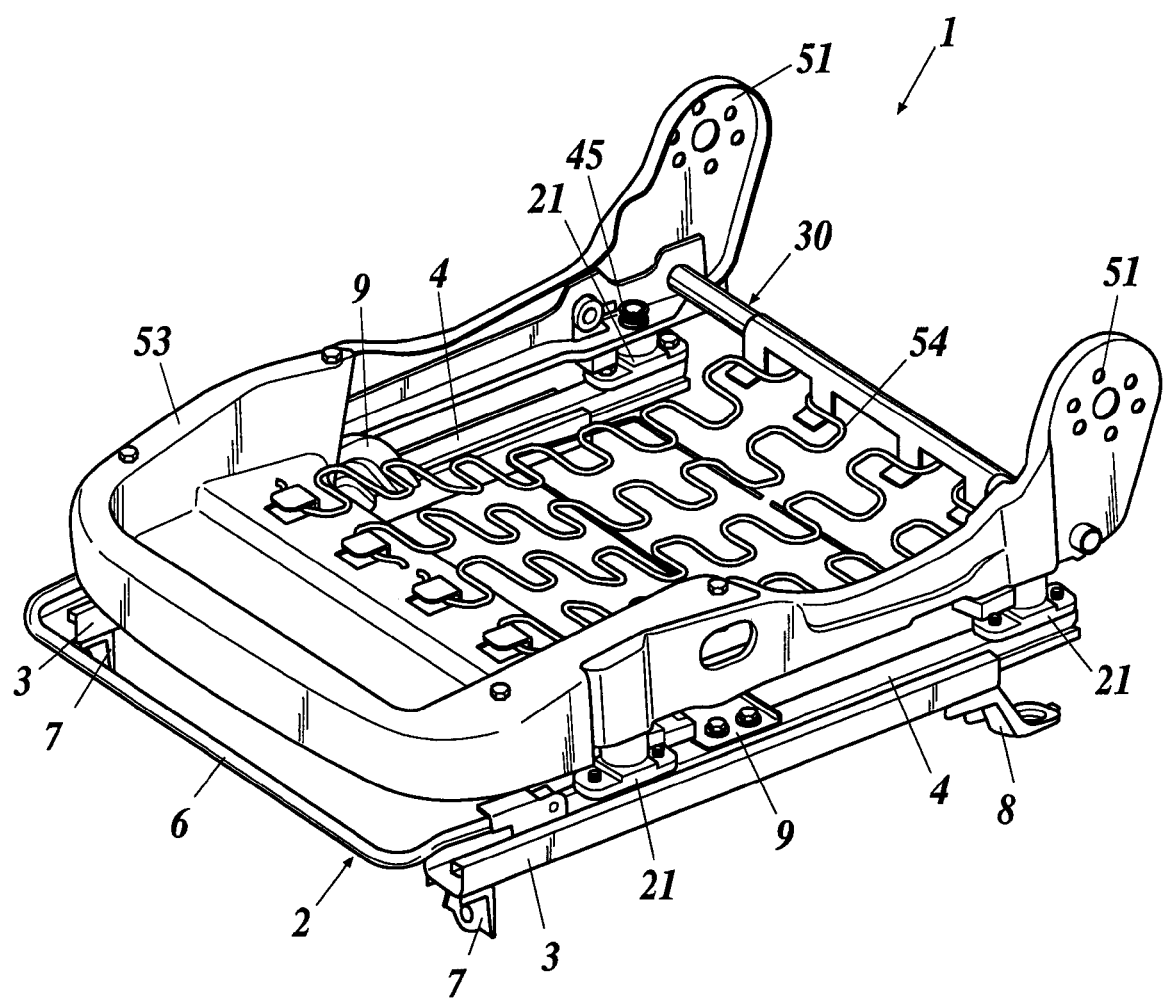
[FIG. 1] This is a perspective diagram of a passenger's weight measurement device 1 for a vehicle seat.
Figure 2:
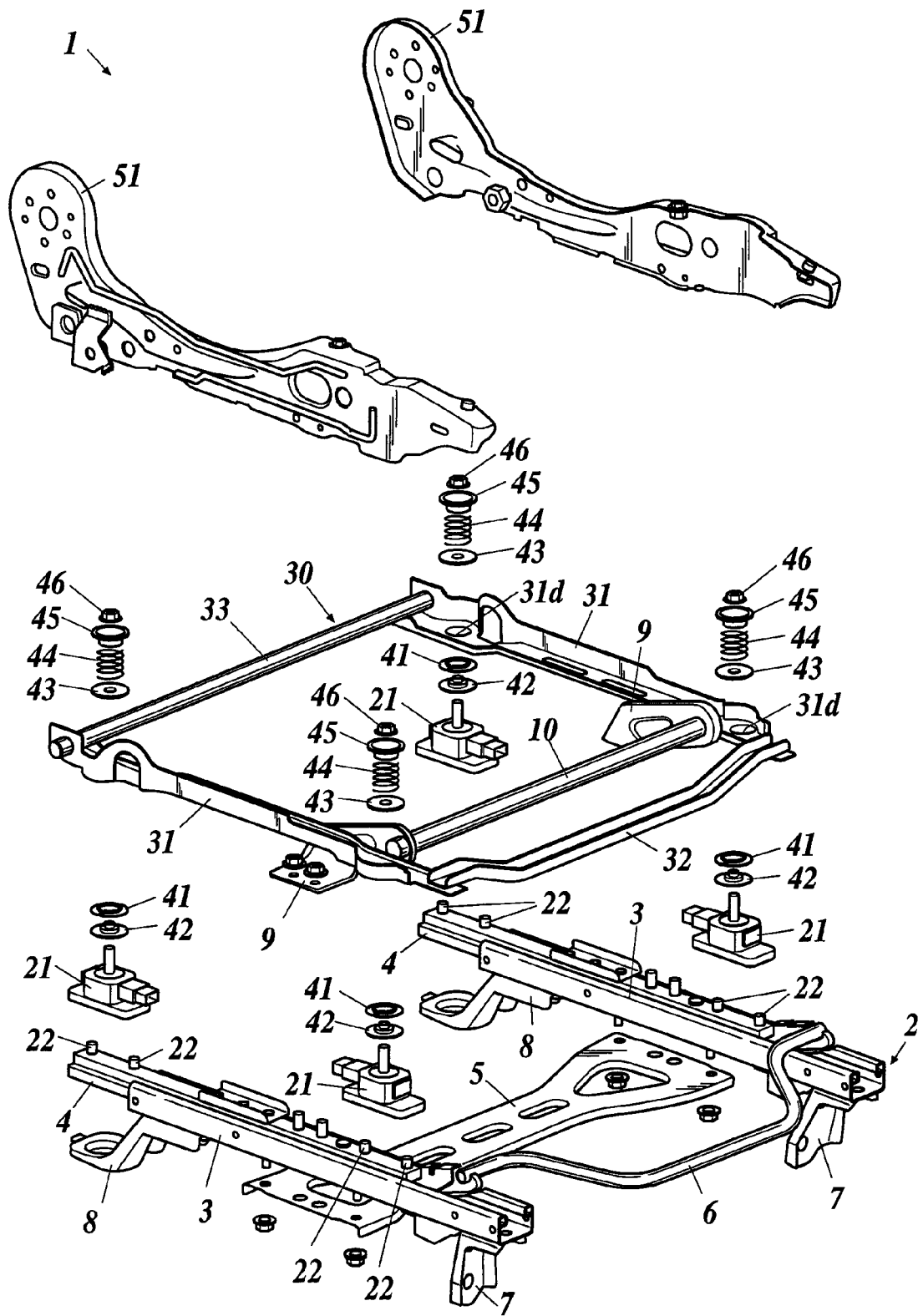
[FIG. 2] This is an exploded perspective diagram of the passenger's weight measurement device 1.

FIG. 1 is a perspective diagram of a passenger's weight measurement device 1 for a vehicle seat, and FIG. 2 is an exploded perspective diagram of the passenger's weight measurement device 1.

As shown in FIG. 1 and FIG. 2, a slide adjuster 2 for adjusting a back-and-forth position of the vehicle seat is attached onto a floor of a passenger's room. The slide adjuster 2 includes a left and right pair of lower rails 3 provided in parallel to each other, a left and right pair of upper rails 4 engaged with the lower rails 3 so as to be capable of sliding on the respective lower rails 3 in a rear and front direction with respect to the lower rails 3, a lower bracket 5 fixed to lower surfaces of the lower rails 3 by bolt/nut coupling or rivet coupling and bridged between the left and right lower rails 3, a lock mechanism 6 for locking the upper rails 4 to the lower rails 3 and for releasing the locking, brackets 7 attached onto front end portions of the lower surfaces of the respective lower rails 3, and brackets 8 attached onto rear end portions of the lower surfaces of the respective lower rails 3. These brackets 7 and 8 are attached onto the vehicle floor, and the lower rails 3 are fixed to the vehicle floor.

Brackets 9 are fixed to middle positions of upper surfaces of the respective upper rails 4 in a rear and front direction by the bolt/nut coupling or the rivet coupling. The brackets 9 are provided in a state of being erected with respect to upper surfaces of the upper rails 4. A right end portion of a submarine pipe 10 is welded to the brackets 9, and the submarine pipe 10 is bridged between the two left and right brackets 9.

A load sensor 21 is mounted on a front end portion of the upper surface of the right upper rail 4, and another load sensor 21 is mounted on a rear end portion thereof. Also on the upper surface of the left upper rail 4, load sensors 21 are mounted on a front end portion and rear end portion thereof, respectively. When viewed from the above, these four load sensors 21 are arranged so as to be apexes of a square or a rectangle.

Figure 3:
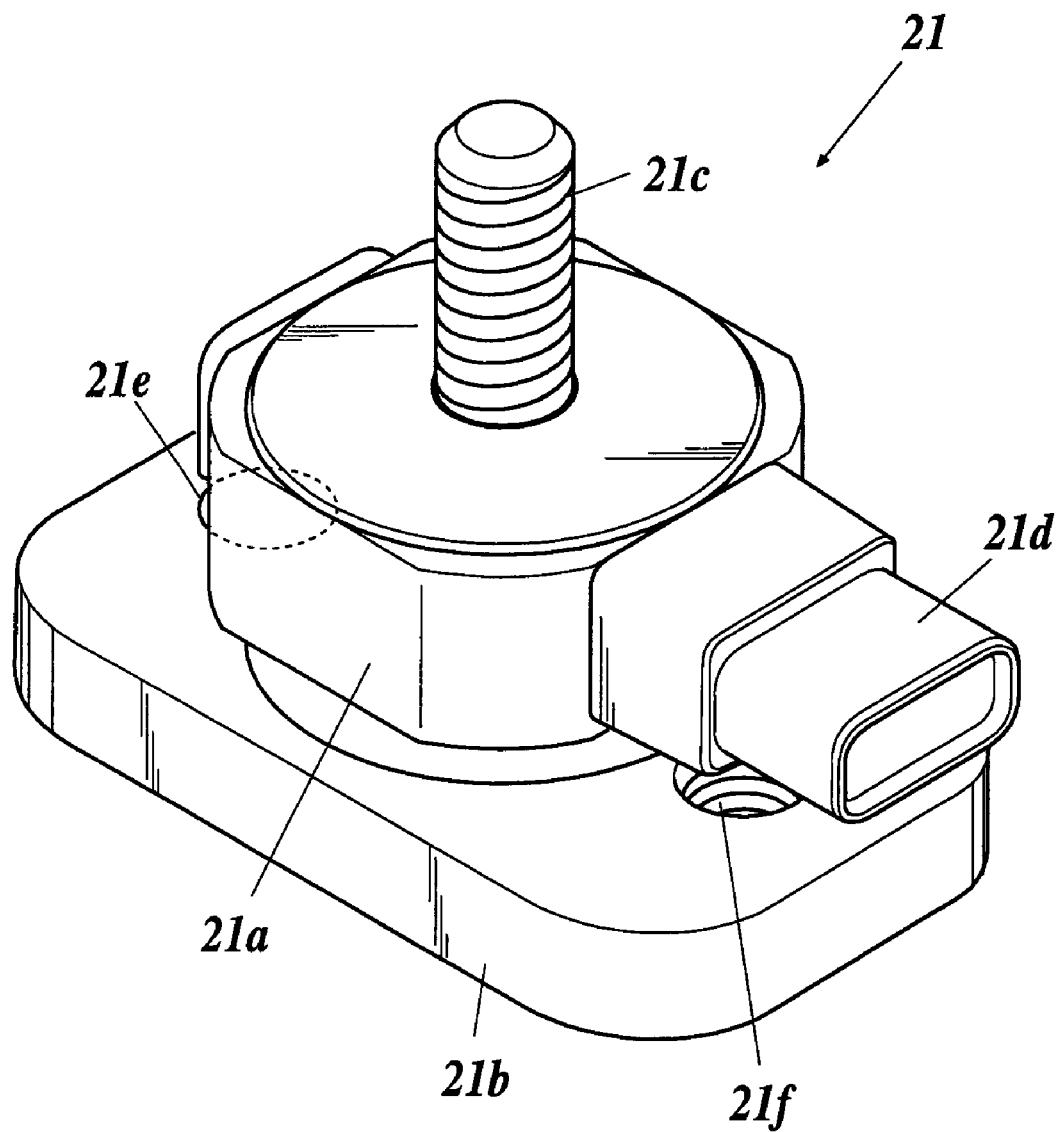
[FIG. 3] This is a perspective diagram of a load sensor 21.

FIG. 3 is a perspective diagram of the load sensor 21. All of the load sensors 21 are provided in a similar way. As shown in FIG. 3, the load sensor 21 includes a columnar sensing portion 21a that senses a load, a plate-like flange portion 21b extending horizontally in a rear and front direction from a lower end of the sensing portion 21a, a rod 21c extending upward from an upper end of the sensing portion 21a, and a connector 21d extending from the sensing portion 21a so as to be parallel to the flange portion 21b. The rod 21c is formed into a male screw shape. Female screw-shaped circular holes 21e and 21f which penetrate the flange portion 21b in the vertical direction are formed in front and rear portions of the flange portion 21b, respectively. The sensing portion 21a incorporates a strain gauge therein, and the load is converted into an electric signal by the strain gauge.

As shown in FIG. 2, the load sensor 21 is fixed to the right upper rail 4. Specifically, a lower surface of the flange portion 21b abuts on the upper surface of the upper rail 4, and two bolts 22 inserted through the upper rail 4 upward from below are screwed to the circular holes 21e and 21f, respectively. Therefore, the load sensor 21 is fixed. Note that the load sensor 21 may be fixed to the upper rail 4 by fastening nuts to the bolts 22 on the flange portion 21b without forming any screw threads in the circular holes 21e and 21f.

Any load sensor 21 is fixed to the upper rails 4 as described above. However, with regard to the two load sensors 21 fixed to the rear portions thereof, the connectors 21d are directed forward, and with regard to the two load sensors 21 fixed to the front portions thereof, the connectors 21d are directed backward.

Figure 4:
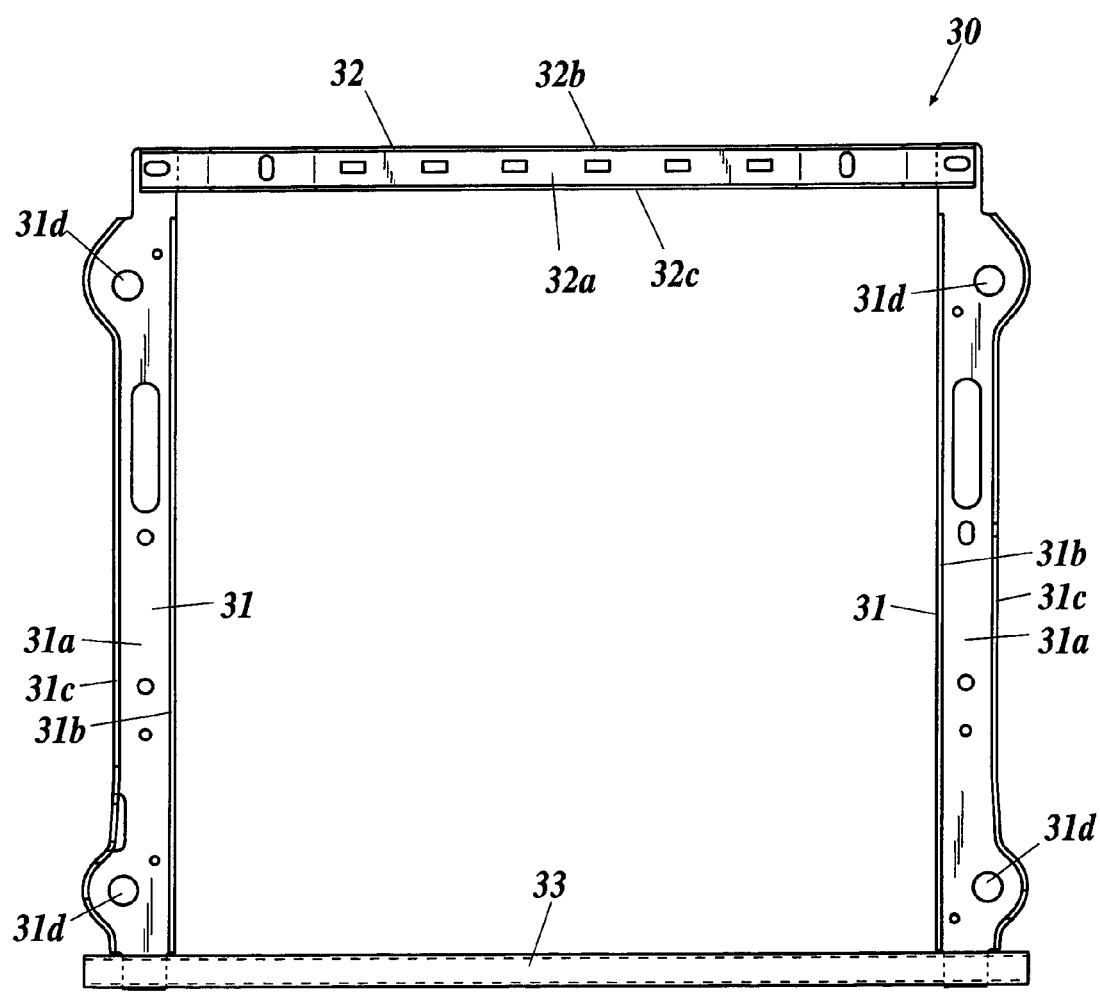
[FIG. 4] This is a plan diagram of a rectangular frame 30.

As shown in FIG. 1 and FIG. 2, the frame 30 having a rectangular frame shape is mounted on these four load sensors 21. FIG. 4 is a top diagram of the rectangular frame 30. As shown in FIG. 4, the rectangular frame 30 is composed of a left and right pair of beams 31, a front beam 32, and a rear cross pipe 33.

Either of the beams 31 is a metal member having a U-shaped cross section, and has a web 31a, an inner flange 31b, and an outer flange 31c. Attachment holes 31d are formed in a front portion and a rear portion of the web 31a, respectively.

The front beam 32 is a metal member having a U-shaped cross section, and has a web 32a, a front flange 32b, and a rear flange 32c. The front beam 32 is bridged between front end portions of the left and right beams 31, and is welded to these beams 31.

The cross pipe 33 is bridged between rear end portions of the left and right beams 31, and is welded to these beams 31.

Figure 5:
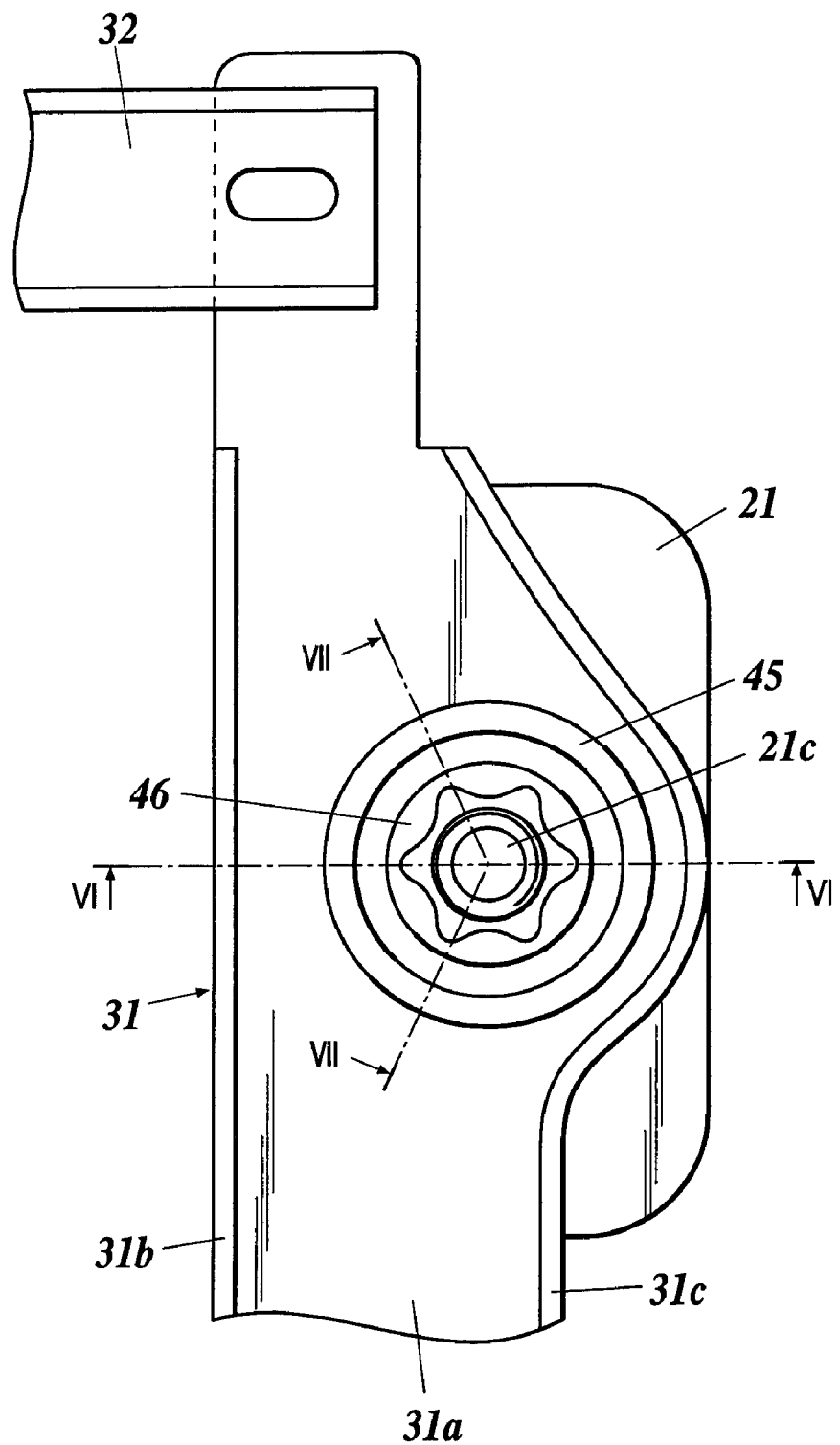
[FIG. 5] This is a plan diagram of a right front portion of the rectangular frame 30.
Figure 6:
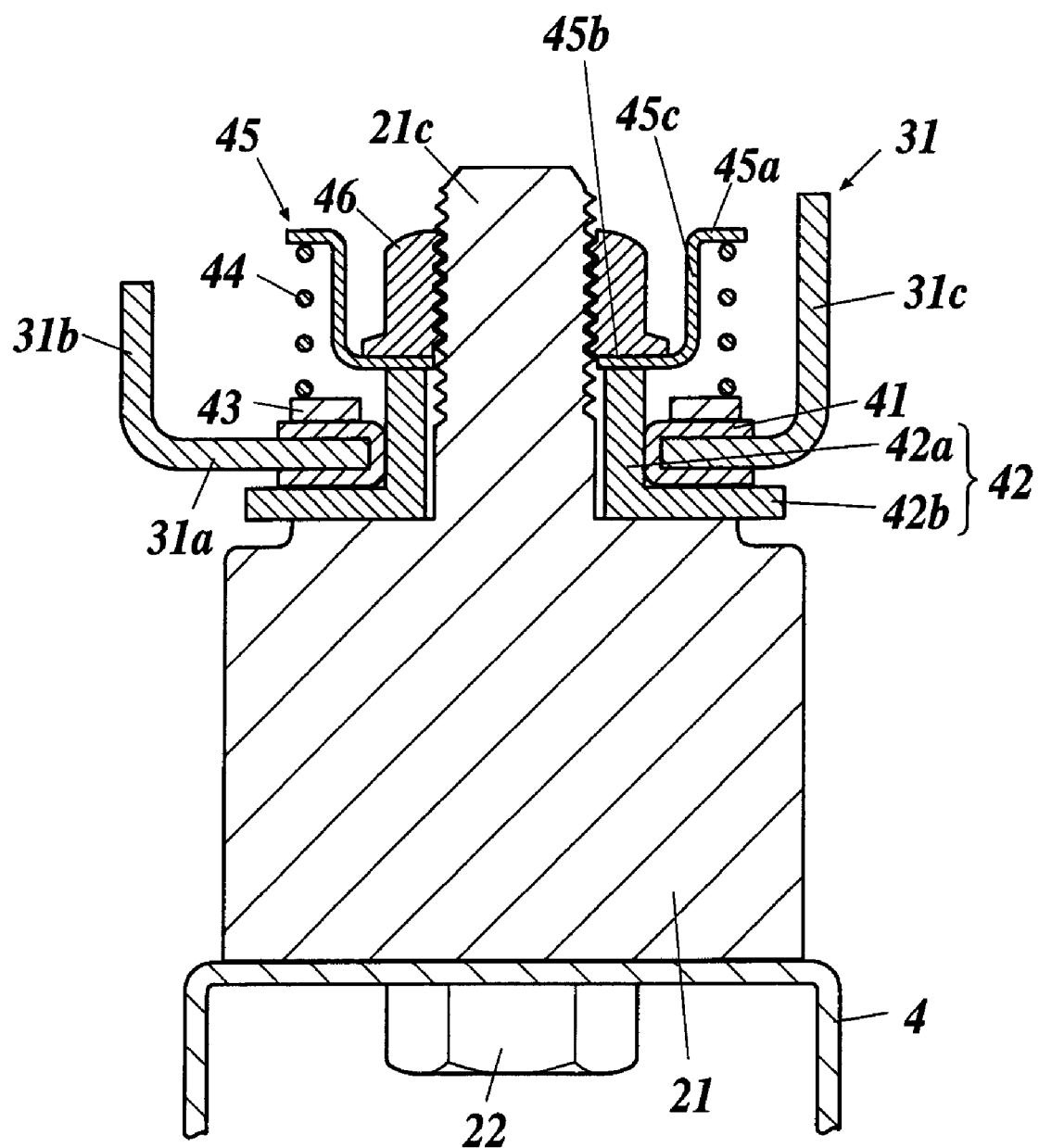
[FIG. 6] This is a cross-sectional diagram showing a cross section along a section line VI-VI of FIG. 5.
Figure 7:
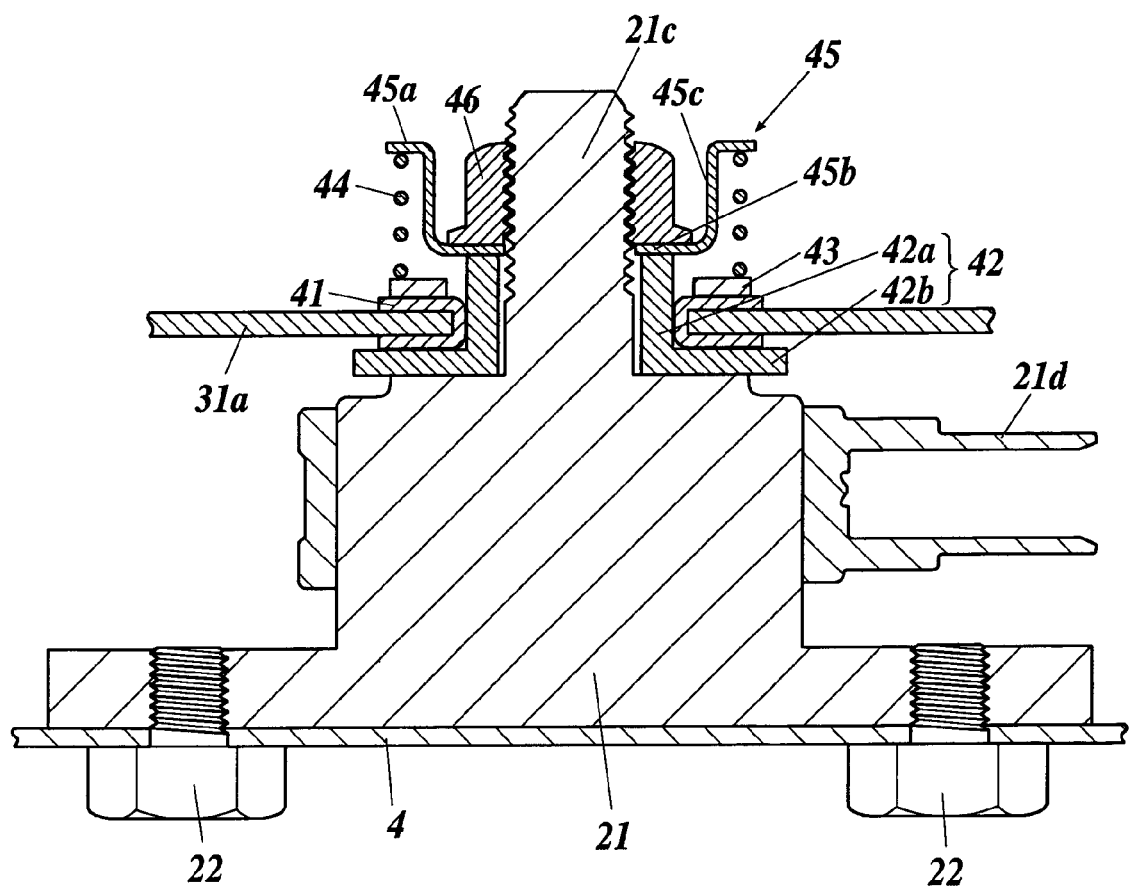
[FIG. 7] This is a cross-sectional diagram showing a cross section along a section line VII-VII of FIG. 5.

The rods 21c of the load sensors 21 are inserted into the respective attachment holes 21d upward from below, and nuts 46 are screwed to the rods 21c. Therefore, the load sensors 21 are attached onto a right front portion, a right rear portion, a left front portion and a left rear portion of the rectangular frame 30, respectively. Referring to FIG. 5 to FIG. 7, an attachment structure for attaching the right front load sensor 21 onto the right front portion of the rectangular frame 30 will be described. FIG. 5 is a plan diagram of the right front portion of the rectangular frame 30, FIG. 6 is a cross-sectional diagram showing a cross section along a line VI-VI, and FIG. 7 is a cross-sectional diagram showing a cross section along a line VII-VII. As shown in FIG. 5 to FIG. 7, an annular bush 41 is fitted to an edge of the right front attachment hole 31d, and grease is applied on the bush 41. The bush 41 is an oilless bush formed by impregnating oil into a metal material, or is made of synthetic resin. The bush 41 may be one made of other materials. Moreover, a stepped collar 42 composed of a cylindrical portion 42a and an annular plate-like flange portion 42b formed on one end surface of the cylindrical portion 42a is inserted through the attachment hole 31d in an inside of the bush 41. Here, the cylindrical portion 42a is inserted through the attachment hole 31d upward from below, and the flange portion 42b engages with a lower surface of the web 31a via the bush 41. Therefore, the stepped collar 42 is not pulled out upward. Moreover, the cylindrical portion 42a protrudes from an upper surface of the web 31a, and an upper end surface of the cylindrical portion 42a is located at a higher position than the upper surface of the web 31a. Here, the cylindrical portion 42a is fitted to the bush 41, and there is no gap between the cylindrical portion 42a and the bush 41.

The rod 21c of the load sensor 21 is inserted through the stepped collar 42 upward from below. An inner diameter of the stepped collar 42 is designed to be slightly larger than a diameter of the rod 21c, and by such designing, a dimension error and an attachment position error are solved.

The nut 46 is screwed to the rod 21c. A plain washer 43, a coil spring 44 and a spring holder 45 are interposed between the upper surface of the web 31a of the beam 31 and the nut 46. The rod 21c and the cylindrical portion 42a of the stepped collar 42 are inserted through the plain washer 43, and the plain washer 43 is set in a state of being mounted on the web 31a, and particularly, on the bush 41. Furthermore, the rod 21c is inserted through the coil spring 44, and the coil spring 44 is set in a state of being mounted on the plain washer 43. A portion of the coil spring 44, which is brought into contact with the plain washer 43, is formed to be flat.

The spring holder 45 includes a cup portion 45c in which a through hole is formed in a bottom 45b, and an annular flange 45a formed on an outer circumferential surface in an opening of the cup portion 45c. Then, the rod 21c penetrates through the through hole of the bottom 45b of the cup portion 45c, the bottom 45b of the cup portion 45c is set in a state of being mounted on an end surface of the stepped collar 42, and the cup portion 45c is inserted into the coil spring 44. Moreover, the coil spring 44 and the plain washer 43 are set in a state of being sandwiched between the flange 45a of the spring holder 45 and the web 31a.

The nut 46 is screwed to the rod 21c in a state of being inserted into the cup portion 45c, and by tightening the nut 46, the bottom 45b of the cup portion 45c is sandwiched between the nut 46 and the upper end surface of the cylindrical portion 42a, and the coil spring 44 and the plain washer 43 are sandwiched between the flange 45a and the web 31a of the beam 31. Moreover, since the coil spring 44 is compressed by tightening the nut 46, the load is applied to the nut 46, and accordingly, the nut 46 is prevented from being loosened. Note that the coil spring 44 is set in a state of being mounted on the web 31a of the beam 31 via the plain washer 43. However, the coil spring 44 may be set in a state of being directly mounted on the web 31a of the beam 31, and the coil spring 44 may be sandwiched between the flange 45a and the web 31a.

Like the right front load sensor 21, the left front, left rear and right rear load sensors 21 are attached onto the left front, left rear and right rear attachment holes 31d, respectively. In a state where the four load sensors 21 are attached onto the rectangular frame 30, the submarine pipe 10 is located behind the front beam 32.

As shown in FIG. 1 and FIG. 2, side frames 51 are welded to the outer flanges 31c of the left and right beams 31, respectively. These side frames 51 are parts of a bottom frame of the vehicle seat.

From above, front portions of the side frames 51 are covered with a pan frame 53, and the side frames 51 and the pan frame 53 are fixed to each other by the bolt/nut coupling or the rivet coupling. A seat spring 54 is bridged between the cross pipe 33 and the pan frame 53, a cushion is mounted on the pan frame 53 and the seat spring 54, and the cushion, the pan frame 53 and the side frames 51 are entirely covered with a cover.

A backrest frame is coupled to rear ends of the side frames 51, and is capable of rising and falling by a reclining mechanism. Note that the backrest frame and the cushion are not shown in order to make it easy to view the drawings.

In the passenger's weight measurement device 1 configured as described above, when a passenger is seated on a seat bottom, a weight of the passenger is applied to the four load sensors 21 through the rectangular frame 30, and is converted into electric signals by these load sensors 21.

Here, the load sensors 21 are attached between the upper rails 4 and the rectangular frame 30, and the load sensors 21 move in a rear and front direction integrally with the vehicle seat. Accordingly, a load inputted from the vehicle seat to the load sensors 21 can be always kept constant irrespective of position of the vehicle seat in a rear and front direction. Therefore, measuring accuracy of the passenger's weight can be enhanced.

Moreover, the spring holder 45 is mounted on the upper end surface of the stepped collar 42, and the coil spring 44 is sandwiched between the spring holder 45 and the web 31a by tightening the nut 46. Accordingly, the rectangular frame 30 can be shifted in the vertical direction with respect to the load sensors 21. Therefore, noise of the load generated by distortion of the slide adjuster 2 and the like becomes smaller.

Moreover, even if the rectangular frame 30 can be shifted in the vertical direction with respect to the load sensors 21, the coil springs 44 are interposed between the nuts 46 and the webs 31a, and accordingly, the load sensors 21 can be fixed to the rectangular frame 30 more stably and appropriately. Therefore, it becomes easier to assemble the passenger's weight measurement device 1.

Moreover, the load is stably applied from each of the coil springs 44 to each of the nuts 46 owing to elastic deformation of the coil spring 44, which is caused by tightening the nut 46.

Moreover, the submarine pipe 10 is located behind the front beam 32, and accordingly, when forward inertial force is applied to the passenger owing to a frontal collision or the like of the vehicle, buttocks of the passenger seated on the vehicle seat are restrained by the submarine pipe 10. Therefore, a so-called submarine phenomenon in which the passenger moves under a waist belt can be prevented.

Note that the present invention is not limited to the above-described embodiment, and various improvements and design changes can be made within the scope without departing from the gist of the present invention.

Figure 8:
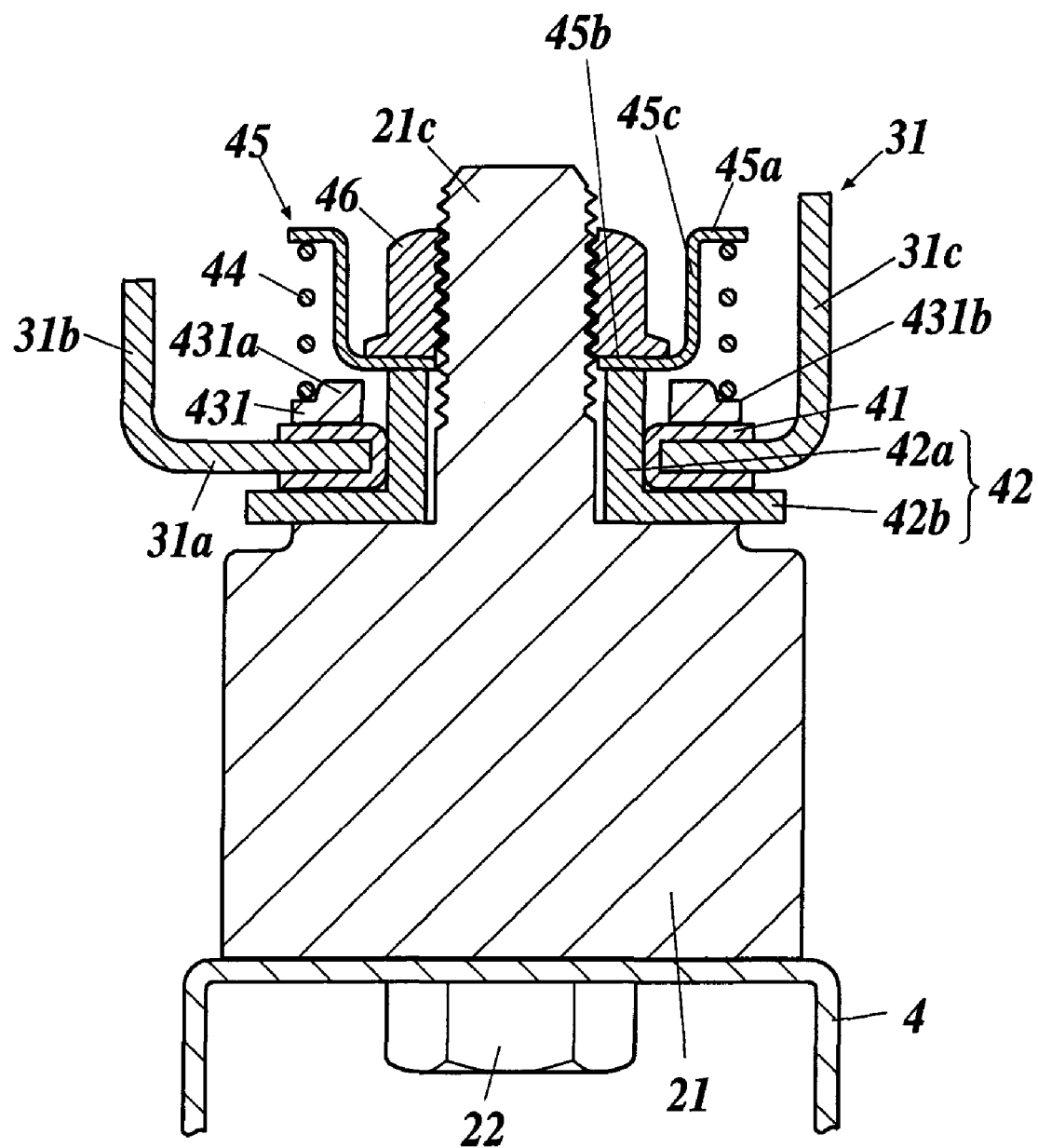
[FIG. 8] This is a cross-sectional diagram showing a modification example of FIG. 6, and showing a cross section along the section line VI-VI in a similar way to FIG. 6.
Figure 9:
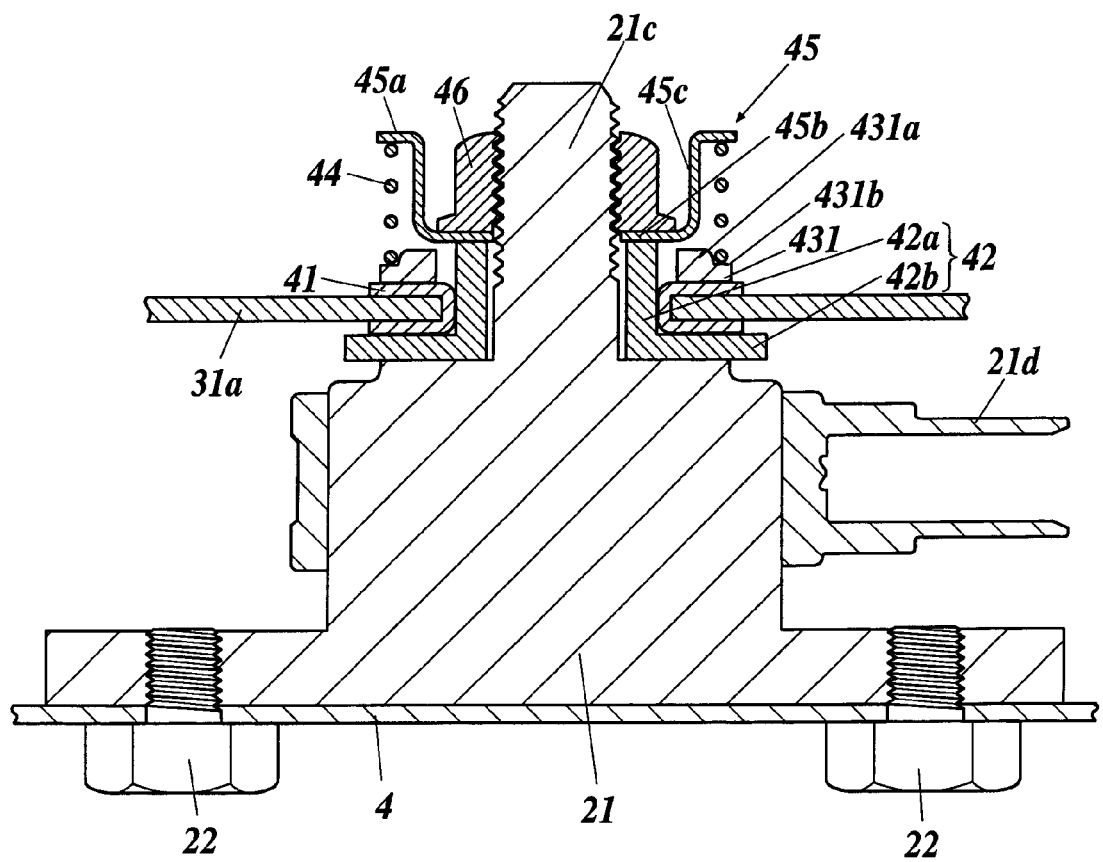
[FIG. 9] This is a cross-sectional diagram showing a modification example of FIG. 7, and showing a cross section along the section line VII-VII in a similar way to FIG. 7.

In the above-described embodiment, the coil spring 44 is set in the state of being mounted on the plain washer 43, and the portion of the coil spring 44, which is brought into contact with the plain washer 43, is made flat. However, for example as shown in FIG. 8 and FIG. 9, a washer 431 in which an inner portion thereof is formed as a protruding portion 431a protruding upward, may be used. An outer edge portion of the protruding portion 431a is formed into a curved surface, and a step difference 431b formed by the protruding portion 431a is formed on an upper surface of the washer 431. An end portion of the coil spring 44 is set in a state of being engaged with the step difference 431b, and the coil spring 44 abuts on the curved surface of the protruding portion 431a and a flat surface of the washer 431. Therefore, the coil spring 44 is centered by the protruding portion 431a of the washer 431 so as not to slip on the flat surface of the washer 431.

What is claimed is:

1. An apparatus for measuring a weight of a vehicle seat occupant, the apparatus comprising:
 a seat rail;
 a seat frame;
 a load sensor between the seat rail and the seat frame, the load sensor comprising a fastening member extendable through a first through-opening defined in the seat frame;
 an elastic member for receiving a portion of the fastening member protruding through the first through-opening; and
 a retainer having a second through-opening defined therein for receiving the protruding portion of the fastening member, and a wall disposed radially from the second through-opening along the length of at least a portion of the elastic member to an outwardly extending lip;
 wherein the elastic member is compressible between the seat frame and the lip.

2. The apparatus of claim 1, further comprising a collar member insertable in the first through-opening and having a passage defined therein for receiving the fastening member.

3. The apparatus of claim 2, wherein the collar member comprises a flange portion under the seat frame.

4. The apparatus of claim 2, wherein the collar member abuts the retainer.

5. The apparatus of claim 1, further comprising a fastener engageable about a distal end of the fastening member, the fastener being constructed to travel along the fastening member and apply against the retainer to selectively affect compression of the elastic member with respect to the seat frame.

6. The apparatus of claim 5, wherein the fastener is a nut.

7. The apparatus of claim 1, wherein the elastic member is a coil spring.

8. The apparatus of claim 1, wherein the fastening member is a threaded bolt.

9. The apparatus of claim 1, wherein the seat rail comprises an upper rail member and a lower rail member, the lower rail member being attachable to the vehicle, the upper rail member being longitudinally slidably engaging the lower rail member.

10. The apparatus of claim 1, wherein the first through-opening is defined in a frame member attached to the seat frame.

11. An apparatus for measuring a weight of a vehicle seat occupant, the apparatus comprising:
  a seat rail;
  a seat frame;
  a load sensor between the seat rail and the seat frame, the load sensor comprising a fastening member for fastening the load sensor to the seat frame;
  a retainer having a wall disposed radially from a bore, the bore being sized to receive a portion of the fastening member, the wall comprising an outwardly extending lip; and
  an elastic member concentric with at least a portion of the wall, the elastic member being compressible with respect to the seat frame and the lip.

12. The apparatus of claim 11, further comprising a fastener engageable about an distal end of the fastening member, the fastener being constructed to travel along the fastening member and selectively affect a compression of the elastic member.

13. The apparatus of claim 12, wherein the fastener is a nut.

14. The apparatus of claim 11, wherein the elastic member is a coil spring.

15. The apparatus of claim 11, wherein the fastening member is a threaded bolt.

16. The apparatus of claim 11, wherein the seat rail comprises an upper rail member and a lower rail member, the lower rail member being attachable to the vehicle, the upper rail member longitudinally slidably engaging the lower rail member.

17. The apparatus of claim 11, wherein the fastening member engages a frame member attached to the seat frame to fasten the load sensor to the seat frame.

18. The apparatus of claim 11, further comprising a washer interposed between the elastic member and the seat frame.

19. An apparatus for measuring the weight of a vehicle seat occupant, the apparatus comprising:
  a seat rail;
  a seat frame;
  a load sensor between the seat rail and the seat frame, the load sensor comprising a fastening member extendable through a first through-opening defined in the seat frame;
  an elastic member for receiving a portion of the fastening member protruding through the first through-opening and
  a retainer having a second through-opening defined therein for receiving the protruding portion of the fastening member, and a wall disposed radially from the second through-opening along the length of at least a portion of the elastic member to an outwardly extending lip;
  wherein the elastic member is compressible between the seat frame and the lip; and
  wherein an extending wall portion extending in a protruding direction of the fastening member is formed in the seat frame.

20. The apparatus of claim 19, wherein at least a part of the elastic member is disposed between the extending wall portion and the fastening member.

21. The apparatus of claim 19, wherein the retainer, the elastic member and the extending wall portion are disposed on a same plane that is perpendicular to an axial line of the fastening member.

22. The apparatus of claim 19, further comprising a fastener engageable about a distal end of the fastening member, the fastener being constructed to travel along the fastening member and apply against the retainer to selectively affect a compression of the elastic member with respect to the seat frame.

23. The apparatus of claim 22, wherein the fastener is a nut.

24. The apparatus of claim 19, wherein the elastic member is a coil spring.

25. The apparatus of claim 19, wherein the fastening member is a threaded bolt.

26. The apparatus of claim 19, wherein the seat rail comprises an upper rail member and a lower rail member, the lower rail member being attachable to the vehicle, the upper rail member being longitudinally slidably engaging the lower rail member.

27. The apparatus of claim 19, wherein the first through-opening is defined in a frame member attached to the seat frame.

28. The apparatus of claim 22, wherein the fastener and the extending wall portion are disposed on a same plane that is perpendicular to an axial line of the fastening member.

29. The apparatus of claim 19, wherein at least a part of the retainer is disposed on an inner side of the elastic member and the retainer comprises a portion that is larger than a diameter of the elastic member.

30. An apparatus for measuring a weight of a vehicle seat occupant, the apparatus comprising:
  a seat rail;
  a seat frame;
  a load sensor between the seat rail and the seat frame, the load sensor comprising a fastening member for fastening the load sensor to the seat frame;
  a retainer having a wall disposed radially from a bore, the bore being sized to receive a portion of the fastening member, the wall comprising an outwardly extending lip; and
  an elastic member concentric with at least a portion of the wall, the elastic member being compressible with respect to the seat frame and the lip; and
  wherein an extending wall portion extending in a longitudinal direction of the fastening member is formed in the seat frame.

31. The apparatus of claim 30, wherein at least a part of the elastic member is disposed between the extending wall portion and the fastening member.

32. The apparatus of claim 30, wherein the retainer, the elastic member and the extending wall portion are disposed on a same plane that is perpendicular to an axial line of the fastening member.

33. The apparatus of claim 30, further comprising a fastener engageable about a distal end of the fastening member, the fastener being constructed to travel along the fastening member and apply against the retainer to selectively affect a compression of the elastic member with respect to the seat frame.

34. The apparatus of claim 33, wherein the fastener is a nut.

35. The apparatus of claim 30, wherein the elastic member is a coil spring.

36. The apparatus of claim 30, wherein the first through-opening is defined in a frame member attached to the seat frame.

37. The apparatus of claim 30, wherein the seat rail comprises an upper rail member and a lower rail member, the lower rail member being attachable to the vehicle, the upper rail member being longitudinally slidably engaging the lower rail member.

38. The apparatus of claim 30, wherein the first through-opening is defined in a frame member attached to the seat frame.

39. The apparatus of claim 33, wherein the fastener and the extending wall portion are disposed on a same plane that is perpendicular to an axial line of the fastening member.

40. The apparatus of claim 30, wherein at least a part of the retainer is disposed on an inner side of the elastic member and the retainer comprises a portion that is larger than a diameter of the elastic member.

41. An apparatus for measuring the weight of a vehicle seat occupant, the apparatus comprising:
   a seat rail;
   a seat frame;
   a load sensor between the seat rail and the seat frame, the load sensor comprising a fastening member extendable through a first through-opening defined in the seat frame;
   an elastic member for receiving a portion of the fastening member protruding through the first through-opening; and
   a retainer having a second through-opening defined therein for receiving the protruding portion of the fastening member, and a wall disposed radially from the second through-opening along the length of at least a portion of the elastic member to an outwardly extending lip;
   wherein the elastic member is compressible between the seat frame and the lip;
   wherein an extending wall portion extending in a protruding direction of the fastening member is formed in the seat frame;
   wherein at least a part of the elastic member is disposed between the extending wall portion and the fastening member;
   wherein the retainer, the elastic member and the extending wall portion are disposed on a same plane that is perpendicular to an axial line of the fastening member; and
   wherein at least a part of the retainer is disposed on an inner side of the elastic member and the retainer comprises a portion that is larger than a diameter of the elastic member.

42. The apparatus of claim 41, further comprising a fastener engageable about a distal end of the fastening member, the fastener being constructed to travel along the fastening member and apply against the retainer to selectively affect a compression of the elastic member with respect to the seat frame;
   wherein the fastener and the extending wall portion are disposed on a same plane that is perpendicular to an axial line of the fastening member.

43. An apparatus for measuring a weight of a vehicle seat occupant, the apparatus comprising:
   a seat rail;
   a seat frame;
   a load sensor between the seat rail and the seat frame, the load sensor comprising a fastening member for fastening the load sensor to the seat frame;
   a retainer having a wall disposed radially from a bore, the bore being sized to receive a portion of the fastening member, the wall comprising an outwardly extending lip; and
   an elastic member concentric with at least a portion of the wall, the elastic member being compressible with respect to the seat frame and the lip;
   wherein an extending wall portion extending in a longitudinal direction of the fastening member is formed in the seat frame;
   wherein at least a part of the elastic member is disposed between the extending wall portion and the fastening member;
   wherein the retainer, the elastic member and the extending wall portion are disposed on a same plane that is perpendicular to an axial line of the fastening member; and
   wherein at least a part of the retainer is disposed on an inner side of the elastic member and the retainer comprises a portion that is larger than a diameter of the elastic member.

44. The apparatus of claim 43, further comprising a fastener engageable about a distal end of the fastening member, the fastener being constructed to travel along the fastening member and apply against the retainer to selectively affect a compression of the elastic member with respect to the seat frame;
   wherein the fastener and the extending wall portion are disposed on a same plane that is perpendicular to an axial line of the fastening member.

* * * * *